US005665833A

United States Patent [19]

Mukaiyama et al.

[11] Patent Number: 5,665,833
[45] Date of Patent: Sep. 9, 1997

[54] METHOD FOR CONTROLLING A POLYMERIZATION RATE OF STYRENE RESINS

[75] Inventors: Hiroto Mukaiyama, Sodegaura; Hayato Kihara, Ichihara, both of Japan

[73] Assignee: Sumitomo Chemical Company, Limited, Osaka, Japan

[21] Appl. No.: 683,197

[22] Filed: Jul. 18, 1996

[30] Foreign Application Priority Data

Jul. 18, 1995 [JP] Japan ............................ 7-181954

[51] Int. Cl.$^6$ .......................... C08F 4/32; C08F 12/08
[52] U.S. Cl. .................. 526/88; 526/219.1; 526/227; 526/232; 526/232.3; 526/346
[58] Field of Search .................. 526/86, 87, 88, 526/346, 219.1, 232, 232.3, 227

[56] References Cited

U.S. PATENT DOCUMENTS

| | | | |
|---|---|---|---|
| 3,080,348 | 3/1963 | Lang et al. | 526/86 X |
| 3,636,326 | 1/1972 | Smith et al. | 526/86 X |
| 3,726,849 | 4/1973 | Dance et al. | 260/93.1 |
| 4,367,320 | 1/1983 | Murray | 526/86 X |
| 4,404,338 | 9/1983 | De Toffol et al. | 526/86 |
| 4,628,034 | 12/1986 | Hofferber | 526/86 X |
| 4,948,847 | 8/1990 | Morita et al. | 526/64 |
| 5,191,040 | 3/1993 | Okumura et al. | 526/65 |

FOREIGN PATENT DOCUMENTS

| | | |
|---|---|---|
| 52-42834 | 10/1977 | Japan . |
| 54-107994 | 8/1979 | Japan . |
| 55-7455 | 2/1980 | Japan . |
| 58-173107 | 10/1983 | Japan . |
| 3-199252 | 8/1991 | Japan . |
| 4-218512 | 8/1992 | Japan . |
| 5-17504 | 1/1993 | Japan . |
| 5-80712 | 3/1994 | Japan . |

*Primary Examiner*—Fred Teskin
*Attorney, Agent, or Firm*—Sughrue, Mion, Zinn, Macpeak & Seas

[57] ABSTRACT

The method for controlling a polymerization rate, in a continuous radical polymerization of mainly styrene monomer using a complete mixing type reactor, without substantially changing an average molecular weight of a polymer formed, comprising the steps of: (a) keeping a polymerization temperature substantially constant at t(°C.), (b) setting a feeding rate of the styrene monomer to A times larger rate than that in a polymerization conducted in the absence of a radical polymerization initiator, and (c) controlling an amount of the radical polymerization initiator added in the range of from $(0.1/n) \times 10^{-3}$ to $(2.0/n) \times 10^{-3}$ mol per 1 liter of the monomer, n being a number of radical generating functional groups present in one molecule of the radical polymerization initiator, such that a polymer concentration x satisfy the mathematical expression: $x \geq 0.3t + 6 \cdot (A-1) + 12$ and that x be kept substantially constant, wherein A represents a ratio of a polymerization rate after being controlled to a rate of polymerization conducted in the absent of the radical polymerization initiator. The method can easily and as desired control the polymerization rate using any desired radical polymerization initiator.

7 Claims, No Drawings

METHOD FOR CONTROLLING A POLYMERIZATION RATE OF STYRENE RESINS

FIELD OF THE INVENTION

The present invention relates to a process for producing styrene resins by means of continuous polymerization in the presence of a radical polymerization initiator. In more particular, the invention relates to a method for controlling a polymerization rate of styrene resins which can easily and as desired control the polymerization rate, that is, the production amount per unit time, using any desired radical polymerization initiator.

BACKGROUND OF THE INVENTION

Styrene resins are in wide use as various molding materials because they show an excellent balance between price, mechanical strength and moldability. The mechanical strength and the moldability depend upon an average molecular weight of the styrene resin. Styrene resins with a higher average molecular weight have a better mechanical strength, and those with a lower average molecular weight have a better moldability.

Therefore, styrene resins with various average molecular weights must be used properly according to intended uses, and hence the development of a process has been awaited which can produce styrene resins having an intended average molecular weight with low cost and with good efficiency. To attain a low cost and efficient production, a polymerization rate must be controlled carefully according to the situation of demand. Moreover, it is necessary that when an equipment trouble happens to occur the polymerization rate is rapidly decreased without changing the average molecular weight of the product and that when the trouble has been removed the polymerization rate is rapidly increased. Accordingly, a method for controlling the polymerization rate easily and in a short time is eagerly desired.

Known processes for industrial production of styrene resins include a thermal polymerization process and an initiator polymerization process.

In the thermal polymerization process, in order to control a polymerization rate without changing an average molecular weight of a resin formed, it is necessary to change a volume of a polymerization solution while maintaining a polymerization temperature constant. However, increasing the volume of the polymerization solution has its limit because of the limitation of dimension of polymerization vessel, and hence the production rate cannot be changed at will. Furthermore, it takes a long time to regulate the volume of the polymerization solution.

In the initiator polymerization process, aside from a method of changing a volume of polymerization solution similar to that described above, a method has been proposed in which an amount of the polymerization initiator fed into a polymerization reactor is changed. In this method, however, a polymerization temperature must be changed simultaneously in order that an average molecular weight of a resin formed may be kept constant. Resultantly, the method has the disadvantage of being unable to control a polymerization rate as desired.

JP-B-41-19511, JP-B-52-42834, JP-B-52-797, JP-B-55-7455 and JP-B-2-21401 disclose methods of increasing a polymerization rate by using a specific polyfunctional organic peroxide as a polymerization initiator.

However, even when these methods are used, it is similarly necessary to change a polymerization temperature, although the controllable range of polymerization rate widens. Therefore, two parameters, that is, the polymerization temperature and the amount of the polymerization initiator charged, must be simultaneously operated to control the polymerization rate and the average molecular weight of styrene resin at the same time; hence the polymerization conditions cannot be easily controlled. Furthermore, since the polymerization initiator used is a specific polyfunctional initiator and other conventional inexpensive polymerization initiators cannot be used, these methods lead to a high production cost.

In view of the situations, the present inventors have made extensive study on the method for controlling a polymerization rate. As the result, the inventors have found a method which can control a polymerization rate easily and in a short time while maintaining an average molecular weight of styrene resin formed constant. The present invention has been attained on the basis of above finding.

SUMMARY OF THE INVENTION

According to the present invention, there is provided a method for controlling a polymerization rate, in a continuous radical polymerization of styrene monomer or a mixture of styrene monomer and at least one monomer copolymerizable therewith using a complete mixing type reactor, without substantially changing an average molecular weight of a polymer formed, comprising the steps of:

(a) keeping a polymerization temperature substantially constant at t(°C.), (b) setting a feeding rate of the styrene monomer or the mixture of styrene monomer and at least one monomer copolymerizable therewith to A times larger rate than that in a polymerization conducted in the absence of a radical polymerization initiator, and (c) controlling an amount of the radical polymerization initiator added in the range of from $(0.1/n) \times 10^{-3}$ to $(2.0/n) \times 10^{-3}$ mol per 1 liter of the monomer fed, n being a number of radical generating functional groups present in one molecule of the radical polymerization initiator, such that a polymer concentration x satisfy the mathematical expression: $x \geq 0.3t + 6 \cdot (A-1) + 12$ and that x be kept substantially constant, wherein A represents a ratio of a polymerization rate after being controlled to a rate of polymerization conducted in the absence of the radical polymerization initiator at the polymerization temperature t(°C.) and the polymer concentration x in a polymerization liquid.

DETAILED DESCRIPTION OF THE INVENTION

The continuous radical polymerization of styrene monomer or a mixture of styrene monomer and at least one monomer copolymerizable therewith in the present invention is carried out in a complete mixing type reactor. When the polymerization is carried out in two or more reactors connected in series, so long as the first stage reactor is of the complete mixing type, the reactors on and after the second stage may be of any types, other than the complete mixing type, used in conventional polymerization process, e.g., the plug flow type and the loop type. The first stage polymerization may also be conducted in plural complete mixing type reactors arranged in parallel. When the first stage reactor is a reactor other than the complete mixing type, for example, a plug flow type tube reactor, a loop reactor using a static mixer, and the like, it is impossible to control the reaction rate without changing the polymerization temperature and while keeping the average molecular weight of the styrene resin formed constant.

The complete mixing type reactor is provided with a stirring means in the reactor. By use of the reactor, the complete mixing state of the polymerization reaction in the present invention is attained. The term "complete mixing state" herein refers to a state in which the concentration and the temperature of the polymer in the reactor are kept substantially uniform. In the present invention, when a continuous radical polymerization is carried out in a complete mixing type reactor, the solution in the reactor is sometimes referred to simply as "polymerization liquid" and the concentration of polymer in the polymerization liquid simply as "polymer concentration".

The complete mixing type reactor is also called a stirred tank reactor and the manner of stirring and the method of heat removal in the complete mixing type reactor are not particularly limited so long as they are satisfactory for attaining the complete mixing state mentioned above. They are specifically described in, for example, "Industrial Reaction Equipment" edited by Kenji Hashimoto and printed by Baifukan Ltd., Japan in 1984, pages 10–11, 19–21 and 206–211.

The monomer of a starting material used in the present invention may be styrene monomer or a mixture of styrene monomer and at least one monomer copolymerizable therewith (hereinafter sometimes they are collectively referred to simply as "said monomer").

Examples of the monomer copolymerizable with styrene monomer include substituted styrenes, e.g., $\alpha$-methylstyrene and p-methylstyrene, vinyl monomers, e.g., acrylonotrile, methacrylonotrile, methacrylic acid, methyl methacrylate and vinyl acrylate, and further maleic anhydride and maleimide.

Into said monomer before being fed to the polymerization, beforehand, or into the polymerization reactor directly, there may be added a solvent, rubber-like elastomer, mineral oil, antioxidant, colorant, internal lubricant, etc. which are soluble or finely dispersible as slurry in the monomer.

The term "thermal polymerization" used in the present invention refers to a polymerization which is conducted by heating, without addition of a radical polymerization initiator.

When a ratio of a polymerization rate after being controlled to a polymerization rate of thermal polymerization of said monomer (in the absence of a radical polymerization initiator) using a complete mixing type reactor at a polymerization temperature t(°C.) and a polymer concentration x, said ratio being set beforehand, is designated as "A", the polymerization rate ratio A can be controlled to the set value a by following the procedure described below, without substantially changing an average molecular weight of the polymer obtained.

The polymerization temperature is maintained substantially constant at the temperature t(°C.).

A feeding rate of the radical polymerization initiator (hereinafter sometimes referred to simply as "polymerization initiator" or "initiator") is set such that a feeding rate of said monomer be A times larger than that in the above-mentioned thermal polymerization, that the polymer concentration x satisfy the mathematical expression (1) and that x be kept substantially constant.

$$x \geq 0.3t + 6 \cdot (A-1) + 12 \quad (1)$$

wherein A is a number greater than 1 and is selected as desired. The concentration x is in the range of usually 50–90% by weight, preferably 60–80% by weight.

The feeding rate of the polymerization initiator, as expressed by a concentration of a radical polymerization initiator having n functional groups (n being a number of radical generating functional groups present in one molecule of the radical polymerization initiator) per 1 liter of said monomer fed, is preferably $(0.1/n) \times 10^{-3}$ to $(2.0/n) \times 10^{-3}$ mol, more preferably $(0.1/n) \times 10^{-3}$ to $(1.5/n) \times 10^{-3}$ mol. The smaller the change in polymer concentration with the change in polymerization rate, the more preferable. More preferably the polymer concentration is approximately constant.

The polymerization temperature is in the range of preferably 110°–160° C., more preferably 120°–155° C. Preferably the temperature after the polymerization rate control is substantially the same as before the rate control.

The feeding rate of said monomer is automatically fixed, as described above, by the feeding rate thereof in thermal polymerization and the aforesaid previously set value of polymerization rate to which the rate is desired to be controlled. Consequently, the only parameter to be controlled in the present invention is the feeding rate of the radical polymerization initiator and hence can be controlled with ease.

The volume of the polymerization liquid in the complete mixing type reactor is usually set to be approximately constant to facilitate the control of polymerization rate. The volume of the liquid may be set at a desired value.

When the polymer concentration does not satisfy the mathematical expression (1), it is difficult to control the polymerization rate without changing the average molecular weight of the styrene resin obtained; this cannot be attained unless the polymerization temperature is changed.

The radical polymerization initiator used in the present invention may be any desired organic peroxide and azo compound.

Examples of the organic peroxide include monofunctional radical polymerization initiators (n=1), such as t-butyl peroxybenzoate, benzoyl peroxide and di-t-butyl peroxide, and polyfunctional polymerization initiators (n$\geq$2), such as 1,1-di-t-butylperoxy-3,3,5-trimethylcyclohexane (n=2) and 2,2-bis(4,4-di-t-butyl-peroxycyclohexyl)propane (n=4).

Examples of the azo compound include monofunctional radical polymerization initiators (n=1), such as 1,1-azobis (cyclohexane-1-carbonitrile) and azobisisobutyronitrile.

Particularly preferred among them are monofunctional radical polymerization initiator as di-t-butylperoxide, etc. because of their easy availability and low cost.

The polymerization initiator may be used for the reaction after being previously dissolved in the starting monomer by use of a stirred vessel or the like; alternatively, it may be injected into the feed line of the starting monomer or directly into the reactor, after being diluted in an appropriate solvent, such as ethylbenzene, or as it is.

According to the present invention, only by controlling the amount of added radical polymerization initiator under specific conditions in a complete mixing type reactor, the polymerization rate, that is, the production amount per unit time, can be controlled easily and as desired while maintaining the average molecular weight of styrene resin formed substantially constant.

DESCRIPTION OF THE PREFERRED EMBODIMENTS

The present invention is described in detail below with reference to Examples, but the invention is in no way limited by the Examples.

A weight average molecular weight shown in Examples refers to an average molecular weight determined by gel permeation chromatography (GPC).

EXAMPLE 1

A continuous polymerization apparatus comprising one complete mixing type stirred polymerization vessel of 30 l inner volume and a flash deaeration vessel was used. First, continuous thermal polymerization was carried out by continuously feeding to the stirred polymerization vessel a monomer solution consisting essentially of 95% by weight of styrene monomer and 5% by weight of ethylbenzene, keeping the polymerization temperature at 145° C. and the volume of the polymerization solution at 24 l, and controlling the monomer feed amount such that the polymer concentration in the polymerization solution might be 63% by weight.

Further, without changing the polymerization temperature and the volume and polymer concentration of the polymerization solution, 1,1-di-t-butylperoxy-3,3,5-trimethylcyclohexane was injected into the monomer feed line to give a concentration shown in Table 1 so that the polymerization rate might be in the range of 1.2–1.8 times larger than the thermal polymerization rate and, at the same time, the feeding rate of the monomer solution was changed in proportion to the polymerization rate.

The number (n) of functional groups in one molecule of 1,1-di-t-butylperoxy-3,3,5-trimethylcyclohexane used as the radical polymerization initiator is 2.

The results obtained in the polymerization are shown in Table 1.

initiator in place of 1,1-di-t-butyl-peroxy-3,3,5-trimethylcyclohexane. The number (n) of functional groups in one molecule of t-butyl peroxybenzoate is 1. The results obtained are shown in Table 2.

TABLE 1

| | | | | | | |
|---|---|---|---|---|---|---|
| Polymerization rate ratio (A) | | 1.0 | 1.2 | 1.4 | 1.6 | 1.8 |
| Polymerization temperature (t) | (°C.) | 145 | 145 | 145 | 145 | 145 |
| Polymerization liquid volume | (l) | 24 | 24 | 24 | 24 | 24 |
| Polymer concentration (x) | (wt %) | 63 | 63 | 63 | 63 | 63 |
| $0.3t + 6 \cdot (A - 1) + 12$ | (wt %) | 55.5 | 56.7 | 57.9 | 59.1 | 60.3 |
| Said monomer solution feed rate | (l/hr) | 4.5 | 5.4 | 6.3 | 7.2 | 8.1 |
| Radical initiator concentration | (***) | 0 | 0.21 | 0.39 | 0.57 | 0.72 |
| Polymer wt. average molecular weight | ($10^4$) | 26 | 26 | 26 | 26 | 26 |

Note:
(***) $10^{-3}$ mol/1 l of said monomer solution

EXAMPLE 2

The procedures of Example 1 were repeated except for using t-butyl peroxybenzoate as the radical polymerization

TABLE 2

| | | | | | | |
|---|---|---|---|---|---|---|
| Polymerization rate ratio (A) | | 1.0 | 1.2 | 1.4 | 1.6 | 1.8 |
| Polymerization temperature (t) | (°C.) | 145 | 145 | 145 | 145 | 145 |
| Polymerization liquid volume | (l) | 24 | 24 | 24 | 24 | 24 |
| Polymer concentration (x) | (wt %) | 63 | 63 | 63 | 63 | 63 |
| $0.3t + 6 \cdot (A - 1) + 12$ | (wt %) | 55.5 | 56.7 | 57.9 | 59.1. | 60.3 |
| Said monomer solution feed rate | (l/hr) | 4.5 | 5.4 | 6.3 | 7.2 | 8.1 |
| Radical initiator concentration | (***) | 0 | 0.37 | 0.70 | 1.02 | 1.25 |
| Polymer wt. average molecular weight | ($10^4$) | 26 | 26 | 26 | 26 | 26 |

Note:
(***) $10^{-3}$ mol/1 l of said monomer solution

EXAMPLE 3

The procedures of Example 1 were repeated except for using 1,1-azobis(cyclohexane-1-carbonitrile) as the radical polymerization initiator in place of 1,1-di-t-butylperoxy-3,3,5-trimethylcyclohexane. The number (n) of functional groups in one molecule of 1,1-azobis(cyclohexane-1-carbonitrile) is 1. The results obtained are shown in Table 3.

TABLE 3

| | | | | | | |
|---|---|---|---|---|---|---|
| Polymerization rate ratio (A) | | 1.0 | 1.2 | 1.4 | 1.6 | 1.8 |
| Polymerization temperature (t) | (°C.) | 145 | 145 | 145 | 145 | 145 |
| Polymerization liquid volume | (l) | 24 | 24 | 24 | 24 | 24 |
| Polymer concentration (x) | (wt %) | 63 | 63 | 63 | 63 | 63 |
| $0.3t + 6 \cdot (A - 1) + 12$ | (wt %) | 55.5 | 56.7 | 57.9 | 59.1 | 60.3 |
| Said monomer solution feed rate | (l/hr) | 4.5 | 5.4 | 6.3 | 7.2 | 8.1 |
| Radical initiator concentration | (***) | 0 | 0.40 | 0.72 | 1.08 | 1.37 |
| Polymer wt. average molecular weight | ($10^4$) | 26 | 26 | 26 | 26 | 26 |

Note:
(***) $10^{-3}$ mol/1 l of said monomer solution

Comparative Example 1

The procedures of Example 1 were repeated except that the polymer concentration in the polymerization solution was kept at 30% by weight. The results obtained are shown in Table 4.

TABLE 4

| | | | | | | |
|---|---|---|---|---|---|---|
| Polymerization rate ratio (A) | | 1.0 | 1.2 | 1.4 | 1.6 | 1.8 |
| Polymerization temperature (t) | (°C.) | 145 | 145 | 145 | 145 | 145 |
| Polymerization liquid volume | (l) | 24 | 24 | 24 | 24 | 24 |
| Polymer concentration (x) | (wt %) | 30 | 30 | 30 | 30 | 30 |
| $0.3t + 6 \cdot (A - 1) + 12$ | (wt %) | 55.5 | 56.7 | 57.9 | 59.1 | 60.3 |
| Said monomer solution feed rate | (l/hr) | 20 | 24 | 28 | 32 | 36 |
| Radical initiator concentration | (***) | 0 | 0.21 | 0.39 | 0.57 | 0.72 |
| Polymer wt. average molecular weight | ($10^4$) | 27 | 26 | 25 | 24 | 23 |

Note:
(***) $10^{-3}$ mol/1 l of said monomer solution

Comparative Example 2

The procedures of Comparative Example 1 were repeated except that the polymerization temperature was controlled so as to obtain styrene resins of the same weight average molecular weight. The results obtained are shown in Table 5.

TABLE 5

| | | | | | | |
|---|---|---|---|---|---|---|
| Polymerization rate ratio (A) | | 1.0 | 1.2 | 1.4 | 1.6 | 1.8 |
| Polymerization temperature (t) | (°C.) | 145 | 143 | 141 | 139 | 137 |
| Polymerization liquid volume | (l) | 24 | 24 | 24 | 24 | 24 |
| Polymer concentration (x) | (wt %) | 30 | 30 | 30 | 30 | 30 |

TABLE 5-continued

| 0.3t + 6·(A − 1) + 12 | (wt %) | 55.5 | 56.1 | 56.7 | 57.3 | 57.9 |
|---|---|---|---|---|---|---|
| Said monomer solution feed rate | (l/hr) | 20 | 24 | 28 | 32 | 36 |
| Radical initiator concentration | (***) | 0 | 0.33 | 0.63 | 0.92 | 1.25 |
| Polymer wt. average molecular weight | (10⁴) | 27 | 27 | 27 | 27 | 27 |

Note:
(***) $10^{-3}$ mol/1 l of said monomer solution

EXAMPLE 4

The procedures of Example 1 were repeated except for keeping the polymerization temperature at 120° C. and the polymer concentration at 60% by weight. The results obtained are shown in Table 6.

TABLE 6

| Polymerization rate ratio (A) | | 1.0 | 1.2 | 1.4 | 1.6 | 1.8 |
|---|---|---|---|---|---|---|
| Polymerization temperature (t) | (°C.) | 120 | 120 | 120 | 120 | 120 |
| Polymerization liquid volume | (l) | 24 | 24 | 24 | 24 | 24 |
| Polymer concentration (x) | (wt %) | 60 | 60 | 60 | 60 | 60 |
| 0.3t + 6·(A − 1) + 12 | (wt %) | 48 | 49.2 | 50.4 | 51.6 | 52.8 |
| Said monomer solution feed rate | (l/hr) | 1.9 | 2.2 | 2.6 | 3.0 | 3.3 |
| Radical initiator concentration | (***) | 0 | 0.12 | 0.21 | 0.27 | 0.33 |
| Polymer wt. average molecular weight | (10⁴) | 40 | 40 | 40 | 40 | 40 |

Note:
(***) $10^{-3}$ mol/1 l of said monomer solution

Comparative Example 3

The procedures of Example 4 were repeated except for keeping the polymer concentration in the polymerization solution at 30% by weight. The results obtained are shown in Table 7.

TABLE 7

| Polymerization rate ratio (A) | | 1.0 | 1.2 | 1.4 | 1.6 | 1.8 |
|---|---|---|---|---|---|---|
| Polymerization temperature (t) | (°C.) | 120 | 120 | 120 | 120 | 120 |
| Polymerization liquid volume | (l) | 24 | 24 | 24 | 24 | 24 |
| Polymer concentration (x) | (wt %) | 30 | 30 | 30 | 30 | 30 |
| 0.3t + 6·(A − 1) + 12 | (wt %) | 48 | 49.2 | 50.4 | 51.6 | 52.8 |
| Said monomer solution feed rate | (l/hr) | 4.6 | 5.5 | 6.4 | 7.4 | 8.3 |
| Radical initiator concentration | (***) | 0 | 0.12 | 0.24 | 0.33 | 0.42 |
| Polymer wt. average molecular weight | (10⁴) | 40 | 40 | 39 | 38 | 37 |

Note:
(***) $10^{-3}$ mol/1 l of said monomer solution

What is claimed is:

1. A method for controlling a polymerization rate, in a continuous radical polymerization of styrene monomer or a mixture of styrene monomer and at least one monomer copolymerizable therewith using a complete mixing type reactor, without substantially changing an average molecular weight of a polymer formed, comprising the steps of:
   (a) keeping a polymerization temperature substantially constant at t(°C.),
   (b) setting a feeding rate of the styrene monomer or the mixture of styrene monomer and at least one monomer copolymerizable therewith to A times larger rate than that in a polymerization conducted in the absence of a radical polymerization initiator, and
   (c) controlling an amount of the radical polymerization initiator added in the range of from $(0.1/n) \times 10^{-3}$ to $(2.0/n) \times 10^{-3}$ mol per 1 liter of the monomer fed, n being a number of radical generating functional groups present in one molecule of the radical polymerization initiator, such that a polymer concentration x satisfies the mathematical expression: $x \geq 0.3t + 6 \cdot (A-1) + 12$ and that x be kept substantially constant, wherein A represents a ratio of a polymerization rate after being controlled to a rate of polymerization conducted in the absence of the radical polymerization initiator at the polymerization temperature t(°C.) and the polymer concentration x in a polymerization liquid.

2. The method according to claim 1 wherein t is any desired temperature in the range of 110°–160° C.

3. The method according to claim 1 wherein t is any desired temperature in the range of 120°–155° C.

4. The method according to claim 1 further including the step of controlling the amount of the radical polymerization initiator added in the range of from $(0.1/n) \times 10^{-3}$ to $(1.5/n) \times 10^{-3}$ mol per 1 liter of the monomer.

5. The method according to claim 1 wherein the radical polymerization initiator is a monofunctional radical polymerization initiator.

6. The method according to claim 1 wherein the radical polymerization initiator is selected from the group consisting of di-t-butyl peroxide, 1,1-di-t-butylperoxy-3,3,5-trimethylcyclohexane, t-butyl peroxybenzoate and 1,1-azobis(cyclohexane-1-carbonitrile).

7. A process of continuous radical polymerization of styrene monomer or a mixture of styrene monomer and at least one monomer copolymerizable therewith using a complete mixing type reactor, without substantially changing an average molecular weight of a polymer formed, comprising controlling a polymerization rate by the steps of:

(a) keeping a polymerization temperature substantially constant at t(°C.), (b) setting a feeding rate of the styrene monomer or the mixture of styrene monomer and at least one monomer copolymerizable therewith to A times larger rate than that in a polymerization conducted in the absence of a radical polymerization initiator, and (c) controlling an amount of the radical polymerization initiator added in the range of from $(0.1/n) \times 10^{-3}$ to $(2.0/n) \times 10^{-3}$ mol per 1 liter of the monomer fed, n being a number of radical generating functional groups present in one molecule of the radical polymerization initiator, such that a polymer concentration x satisfies the mathematical expression: $x \geq 0.3t + 6 \cdot (A-1) + 12$ and that x be kept substantially constant, wherein A represents a ratio of a polymerization rate after being controlled to a rate of polymerization conducted in the absence of the radical polymerization initiator at the polymerization temperature t(°C.) and the polymer concentration x in a polymerization liquid.

* * * * *